(12) United States Patent
Zhou et al.

(10) Patent No.: US 11,368,240 B2
(45) Date of Patent: Jun. 21, 2022

(54) SIGNAL PROCESSING METHOD AND APPARATUS (71) Applicant: Huawei Technologies Co., Ltd., Shenzhen (CN)

(72) Inventors: Xu Zhou, Shenzhen (CN); Xiang Liu, Bridgewater, NJ (US); Yansi Le, Shenzhen (CN); Zhiyong Feng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/181,760

(22) Filed: Feb. 22, 2021

(65) Prior Publication Data

US 2021/0175994 A1 Jun. 10, 2021

Related U.S. Application Data (63) Continuation of application No. PCT/CN2019/099362, filed on Aug. 6, 2019.

(30) Foreign Application Priority Data

Aug. 22, 2018 (CN) .......................... 201810959203.1

(51) Int. Cl.
*H04J 14/00* (2006.01)
*H04J 14/02* (2006.01)
*H04B 10/69* (2013.01)

(52) U.S. Cl.
CPC ........ *H04J 14/0224* (2013.01); *H04B 10/697* (2013.01)

(58) Field of Classification Search
CPC .. H04J 14/0224; H04J 14/0227; H04B 10/27; H04B 10/697; H04B 10/40; H04B 10/5165; H04B 10/66

(Continued)

(56) References Cited

U.S. PATENT DOCUMENTS 8,687,962 B2 * 4/2014 Gottwald ......... H04B 10/25753
398/69
9,509,407 B2 * 11/2016 Gottwald ............. H04B 10/504
(Continued)

FOREIGN PATENT DOCUMENTS

CN 1826781 A 8/2006
CN 101237225 A 8/2008
(Continued)

OTHER PUBLICATIONS

Muciaccia et al., "Reti WDM PON:Principali Sfide," total 14 pages (Feb. 2014).

(Continued)

*Primary Examiner* — Hanh Phan
(74) *Attorney, Agent, or Firm* — Leydig, Voit & Mayer, Ltd.

(57) ABSTRACT

A signal processing method and apparatus are provided. The method includes: receiving an optical signal in a target receive channel, and converting the optical signal into an electrical signal; determining, in the converted electrical signal, an electrical signal associated with a non-overlapping frequency band between the target receive channel and another channel, where the another channel is a channel that overlaps the target receive channel; and determining, based on the electrical signal associated with the non-overlapping frequency band, an electrical signal corresponding to a valid received optical signal that does not include an interfering optical signal in the target receive channel. According to the application, the target transmit channel and the another channel are set to channels that overlap each other, thereby reducing bandwidths occupied by the channels. In the method provided in the embodiments of this disclosure, spectrum utilization can be improved, thereby improving a data transmission rate.

20 Claims, 8 Drawing Sheets (58) Field of Classification Search
USPC .... 398/66, 67, 68, 69, 70, 71, 72, 158, 159,
398/202, 204, 205, 206, 207, 208, 209,
398/33, 38, 135, 136, 79
See application file for complete search history.

(56) References Cited

U.S. PATENT DOCUMENTS

2009/0305628 A1   12/2009  Vavik
2016/0056858 A1    2/2016  Harrison et al.

FOREIGN PATENT DOCUMENTS

| CN | 103078816 A | 5/2013 |
| CN | 103107851 A | 5/2013 |
| EP | 3267605 A1 | 1/2018 |
| WO | 2013026038 A1 | 2/2013 |

OTHER PUBLICATIONS

EP/19851442, Search Report, dated Aug. 20, 2021.
Al-Qazwini et al., "Symmetric 10-GB/s WDM-PON Using Directly Modulated Lasers for Downlink and RSOAs for Uplink," Journal of Lightwave Technology, vol. 30, No. 12, pp. 1891-1899 (Jun. 15, 2012).

\* cited by examiner

FIG. 1

(PRIOR ART)

FIG. 2

(PRIOR ART)

SIGNAL PROCESSING METHOD AND APPARATUS

CROSS-REFERENCE TO RELATED APPLICATIONS

This application is a continuation of International Application No. PCT/CN2019/099362, filed on Aug. 6, 2019, which claims priority to Chinese Patent Application No. 201810959203.1, filed on Aug. 22, 2018. The disclosures of the aforementioned applications are hereby incorporated by reference in their entireties.

TECHNICAL FIELD

Embodiments of this application are related to the field of optical communications technologies, and in particular, to a signal processing method and apparatus.

BACKGROUND

With the development of optical communications technologies, optical communication has been applied to various communications fields, including the posts and telecommunications field, the broadcast communications field, the electric power communications field, the oil communications field, the military communications field, and the like. In application, common optical communications technologies include a wavelength division multiplexing technology. The wavelength division multiplexing technology is a technology in which at least two types of optical signals with different wavelengths (the optical signal may carry data to be transmitted, such as video, audio, and image data) are coupled together and transmitted by using a same optical fiber. By coupling and transmitting the at least two types of optical signals with different wavelengths, spectrum utilization can be improved, thereby further improving a data transmission rate.

Figure 1:
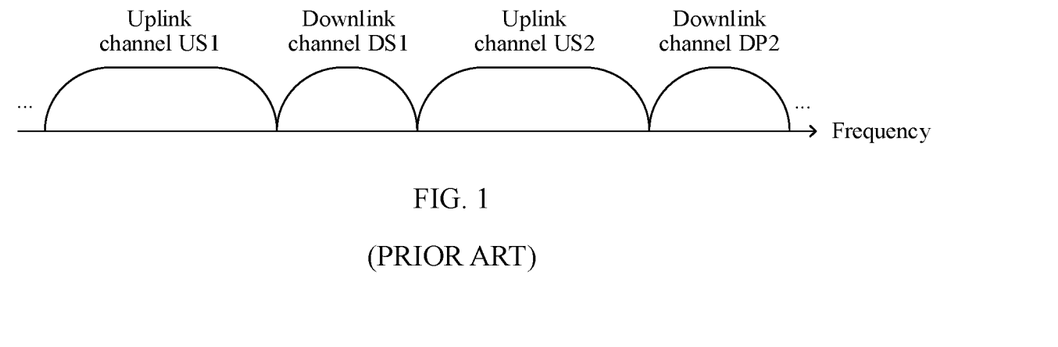
FIG. 1 is a diagram of bandwidth distribution corresponding to an uplink channel and a downlink channel that are used to transmit optical signals according to an example embodiment.

The optical signal may be one of a double-sideband optical signal or a single-sideband optical signal. A spectrum of the double-sideband optical signal includes two parts of mutually conjugated spectrums. The double-sideband optical signal occupies a bandwidth of 2B in frequency domain. The single-sideband optical signal occupies a bandwidth of B in frequency domain. Herein, B is a preset value. Refer to FIG. 1 for a diagram of bandwidth distribution corresponding to an uplink channel and a downlink channel that are used to transmit optical signals.

Figure 2:
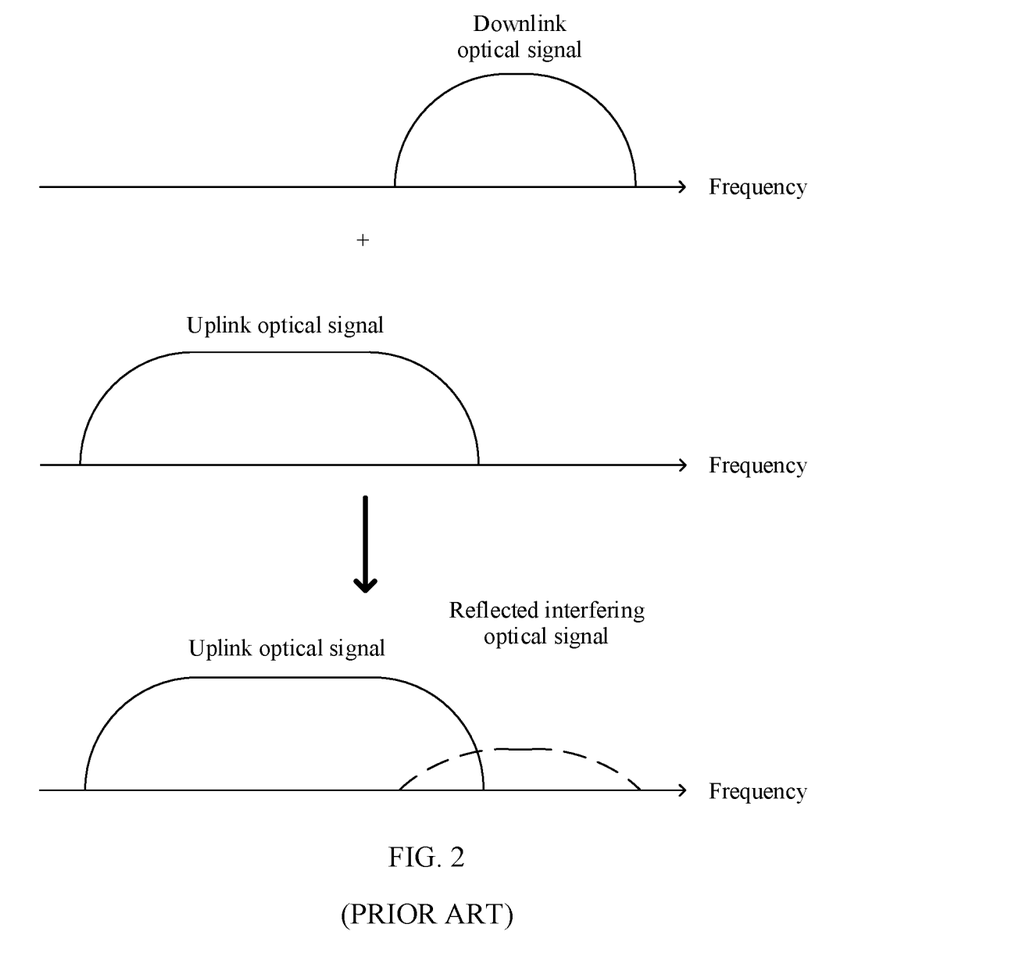
FIG. 2 is a schematic diagram of signal reflection according to an example embodiment.

It may be learned based on FIG. 1 that the uplink channel does not overlap the downlink channel in frequency domain. A reason is that, when a service provider device sends a downlink optical signal to user equipment, and the user equipment also sends an uplink optical signal to the service provider device at the same time, for the service provider device, a reflected interfering optical signal is generated from the sent downlink optical signal under a Rayleigh reflection effect. If the uplink channel overlaps the downlink channel in frequency domain, as shown in FIG. 2, the reflected interfering optical signal is superimposed on the uplink optical signal. As a result, the reflected interfering optical signal interferes with the uplink optical signal.

In a process of implementing this disclosure, the inventor finds that at least the following problems exist:

With the advent of the information era, people have an increasingly high requirement for a data transmission rate. However, there is no effective technical solution in a related technology to further reduce bandwidths occupied by the uplink channel and the downlink channel in frequency domain. Therefore, spectrum utilization cannot be further improved. Consequently, the data transmission rate cannot be improved.

SUMMARY

To overcome the problem in the related technology, this disclosure provides the following technical solutions:

According to a first aspect of an embodiment of this disclosure, a signal processing method is provided. The method includes:

receiving an optical signal in a target receive channel, and converting the optical signal into an electrical signal;

determining, in the converted electrical signal, an electrical signal corresponding to a non-overlapping frequency band between the target receive channel and another channel, where the another channel is a channel that overlaps the target receive channel; and determining, based on the electrical signal corresponding to the non-overlapping frequency band, an electrical signal corresponding to a valid received optical signal that does not include an interfering optical signal in the target receive channel.

In a possible implementation, the interfering optical signal includes a reflected interfering optical signal, and the another channel is a target transmit channel that overlaps the target receive channel.

In the method provided in this embodiment of this disclosure, the target transmit channel and the another channel are set to channels that overlap each other, thereby reducing bandwidths occupied by the channels. In addition, in the method provided in this embodiment of this disclosure, an electrical signal corresponding to an interfering optical signal received by a signal processing device may be further removed. Even if channels overlap each other, correctly reading data carried in an optical signal is not affected. Therefore, in the method provided in this embodiment of this disclosure, spectrum utilization can be improved, thereby improving a data transmission rate.

In a possible implementation, the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

If the signal processing device is user equipment, the valid received optical signal is a single-sideband optical signal, the reflected interfering optical signal is a double-sideband optical signal, the part of the frequency band of the target transmit channel overlaps the target receive channel, and the part of the frequency band is the frequency band between the central frequency and any edge frequency of the target transmit channel.

In a possible implementation, the determining, based on the electrical signal corresponding to the non-overlapping frequency band, an electrical signal corresponding to a valid received optical signal that does not include an interfering optical signal in the target receive channel includes:

determining a conjugate electrical signal corresponding to the electrical signal corresponding to the non-overlapping frequency band;

determining an electrical signal corresponding to an overlapping frequency band between the target receive channel and the target transmit channel; and determining a difference between the conjugate electrical signal and the electrical signal that corresponds to the overlapping frequency band, as the electrical signal corresponding to the valid received optical signal that does not include the reflected interfering optical signal in the target receive channel.

The reflected interfering optical signal is a double-sideband optical signal. The reflected interfering optical signal is subject to a line on which a central frequency is located. Spectrums on two sides of the signal are conjugated. Spectrums on two sides of an electrical signal corresponding to the reflected interfering optical signal are also conjugated. Therefore, the electrical signal corresponding to the valid received optical signal can be recovered based on a conjugate feature. First, a central frequency of an electrical signal corresponding to a received optical signal is a zero frequency. Up-conversion needs to be performed on the electrical signal corresponding to the received optical signal, to place a zero-frequency location on an edge side of the electrical signal corresponding to the non-overlapping frequency band. Then, a low-pass filter is set. A cut-off frequency of the low-pass filter is a frequency corresponding to an edge side of the electrical signal corresponding to the non-overlapping frequency band. Further, the electrical signal corresponding to the received optical signal is input to the low-pass filter, so that a part less than the cut-off frequency can be filtered out. Then, down-conversion is performed on the filtered electrical signal, to recover a frequency of the filtered electrical signal to an initial frequency. In this way, the electrical signal corresponding to the non-overlapping frequency band can be finally obtained, and a conjugate electrical signal corresponding to the electrical signal corresponding to the non-overlapping frequency band can be further calculated. Then, a high-pass filter may be set. A cut-off frequency of the high-pass filter is a central frequency of the electrical signal corresponding to the reflected interfering optical signal. Further, the electrical signal corresponding to the received optical signal is input to the high-pass filter, so that a part greater than the cut-off frequency can be filtered out. In this way, the electrical signal corresponding to the overlapping frequency band between the target receive channel and the target transmit channel can be finally obtained. Finally, the difference between the conjugate electrical signal and the electrical signal that corresponds to the overlapping frequency band may be determined as the electrical signal corresponding to the valid received optical signal that does not include the reflected interfering optical signal in the target receive channel.

In a possible implementation, the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel.

If the signal processing device is a service provider device, the valid received optical signal is a double-sideband optical signal, the reflected interfering optical signal is a single-sideband optical signal, the part of the frequency band of the target receive channel overlaps the target transmit channel, and the part of the frequency band is the frequency band between the central frequency and any edge frequency of the target receive channel.

In a possible implementation, the determining, based on the electrical signal corresponding to the non-overlapping frequency band, an electrical signal corresponding to a valid received optical signal that does not include an interfering optical signal in the target receive channel includes:

determining a conjugate electrical signal corresponding to the electrical signal corresponding to the non-overlapping frequency band; and combining the conjugate electrical signal and the electrical signal that corresponds to the non-overlapping frequency band, to obtain the electrical signal corresponding to the valid received optical signal that does not include the reflected interfering optical signal in the target receive channel.

First, a central frequency of an electrical signal corresponding to a received optical signal is a zero frequency. Up-conversion needs to be performed on the electrical signal corresponding to the received optical signal, to place a zero-frequency location on an edge side of the electrical signal corresponding to the non-overlapping frequency band. Then, a low-pass filter is set. A cut-off frequency of the low-pass filter is a frequency corresponding to an edge side of the electrical signal corresponding to the non-overlapping frequency band. Further, the electrical signal corresponding to the received optical signal is input to the low-pass filter, so that a part less than the cut-off frequency can be filtered out. Then, down-conversion is performed on the filtered electrical signal, to recover a frequency of the filtered electrical signal to an initial frequency. In this way, the electrical signal corresponding to the non-overlapping frequency band can be finally obtained, and a conjugate electrical signal corresponding to the electrical signal corresponding to the non-overlapping frequency band can be further calculated. Finally, the electrical signal corresponding to the valid received optical signal that does not include the reflected interfering optical signal in the target receive channel is obtained through combining the conjugate electrical signal and the electrical signal that corresponds to the non-overlapping frequency band.

In a possible implementation, the another channel is an adjacent receive channel that overlaps the target receive channel.

In a possible implementation, the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

In a possible implementation, the determining, based on the electrical signal corresponding to the non-overlapping frequency band, an electrical signal corresponding to a valid received optical signal that does not include an interfering optical signal in the target receive channel includes:

determining a conjugate electrical signal corresponding to the electrical signal corresponding to the non-overlapping frequency band; and combining the conjugate electrical signal and the electrical signal that corresponds to the non-overlapping frequency band, to obtain the electrical signal corresponding to the valid received optical signal that does not include the reflected interfering optical signal in the target receive channel.

According to a second aspect of an embodiment of this disclosure, a signal processing apparatus is provided. The apparatus includes:

a receiving module, configured to: receive an optical signal in a target receive channel, and convert the optical signal into an electrical signal; and a determining module, configured to determine, in the converted electrical signal, an electrical signal corresponding to a non-overlapping frequency band between the target receive channel and another channel, where the another channel is a channel that overlaps the target receive channel, and the determining module is further configured to determine, based on the electrical signal corresponding to the non-overlapping frequency band, an electrical signal corresponding to a valid received optical signal that does not include an interfering optical signal in the target receive channel.

In a possible implementation, the interfering optical signal includes a reflected interfering optical signal, and the another channel is a target transmit channel that overlaps the target receive channel.

In a possible implementation, the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

In a possible implementation, the determining module is configured to:

determine a conjugate electrical signal corresponding to the electrical signal corresponding to the non-overlapping frequency band;

determine an electrical signal corresponding to an overlapping frequency band between the target receive channel and the target transmit channel; and determine a difference between the conjugate electrical signal and the electrical signal that corresponds to the overlapping frequency band as the electrical signal corresponding to the valid received optical signal that does not include the reflected interfering optical signal in the target receive channel.

In a possible implementation, the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel.

In a possible implementation, the determining module is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

In a possible implementation, the another channel is an adjacent receive channel that overlaps the target receive channel.

In a possible implementation, the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

In a possible implementation, the determining module is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

According to a third aspect of an embodiment of this disclosure, a signal processing device is provided. The signal processing device includes a processor and a receiver.

The receiver is configured to: receive an optical signal in a target receive channel, and convert the optical signal into an electrical signal.

The processor is configured to: determine, in the converted electrical signal, an electrical signal corresponding to a non-overlapping frequency band between the target receive channel and another channel, where the another channel is a channel that overlaps the target receive channel; and determine, based on the electrical signal corresponding to the non-overlapping frequency band, an electrical signal corresponding to an valid received optical signal that does not include an interfering optical signal in the target receive channel.

In a possible implementation, the interfering optical signal includes a reflected interfering optical signal, and the another channel is a target transmit channel that overlaps the target receive channel.

In a possible implementation, the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

In a possible implementation, the processor is configured to:

determine a conjugate electrical signal corresponding to the electrical signal corresponding to the non-overlapping frequency band;

determine an electrical signal corresponding to an overlapping frequency band between the target receive channel and the target transmit channel; and determine a difference between the conjugate electrical signal and the electrical signal that corresponds to the overlapping frequency band as the electrical signal corresponding to the valid received optical signal that does not include the reflected interfering optical signal in the target receive channel.

In a possible implementation, the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel.

In a possible implementation, the processor is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

In a possible implementation, the another channel is an adjacent receive channel that overlaps the target receive channel.

In a possible implementation, the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

In a possible implementation, the processor is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

According to a fourth aspect of an embodiment of this disclosure, a computer readable storage medium is provided, including an instruction. When the computer readable storage medium is run on a signal processing device, the signal processing device is enabled to perform the foregoing signal processing method.

According to a fifth aspect of an embodiment of this disclosure, a computer program product including an instruction is provided. When the computer program product is run on a signal processing device, the signal processing device is enabled to perform the foregoing signal processing method.

The technical solutions provided in the embodiments of this disclosure may include the following beneficial effects:

In the method provided in the embodiments of this disclosure, the target transmit channel and the another channel are set to channels that overlap each other, thereby reducing bandwidths occupied by the channels. In addition, in the method provided in the embodiments of this disclosure, an electrical signal corresponding to an interfering optical signal received by the signal processing device may be further removed. Even if channels overlap each other, correctly reading data carried in an optical signal is not affected. Therefore, in the method provided in the embodiments of this disclosure, spectrum utilization can be improved, thereby improving a data transmission rate.

It should be understood that the foregoing general descriptions and the following detailed descriptions are merely examples and explanations, and cannot limit this disclosure.

BRIEF DESCRIPTION OF DRAWINGS

The accompanying drawings herein are incorporated in this specification, constitute a part of this specification, show embodiments in accordance with this disclosure, and are used with this specification to explain a principle of this disclosure. In the drawings.

The foregoing accompanying drawings show specific embodiments of this disclosure, and more detailed descriptions are provided in the following. The accompanying drawings and text descriptions are not intended to limit the scope of the idea of this disclosure in any manner, but are intended to describe the concept of this disclosure to a person skilled in the art with reference to particular embodiments.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementation manners consistent with this disclosure. On the contrary, they are only examples of apparatuses and methods that are described in the appended claims in detail and that are consistent with some aspects of this disclosure.

An embodiment of this disclosure provides a signal processing method. The method may be implemented by a signal processing device. The signal processing device may be user equipment or a service provider device. The signal processing device may be simultaneously used as a receiver and a transmitter.

Figure 3:
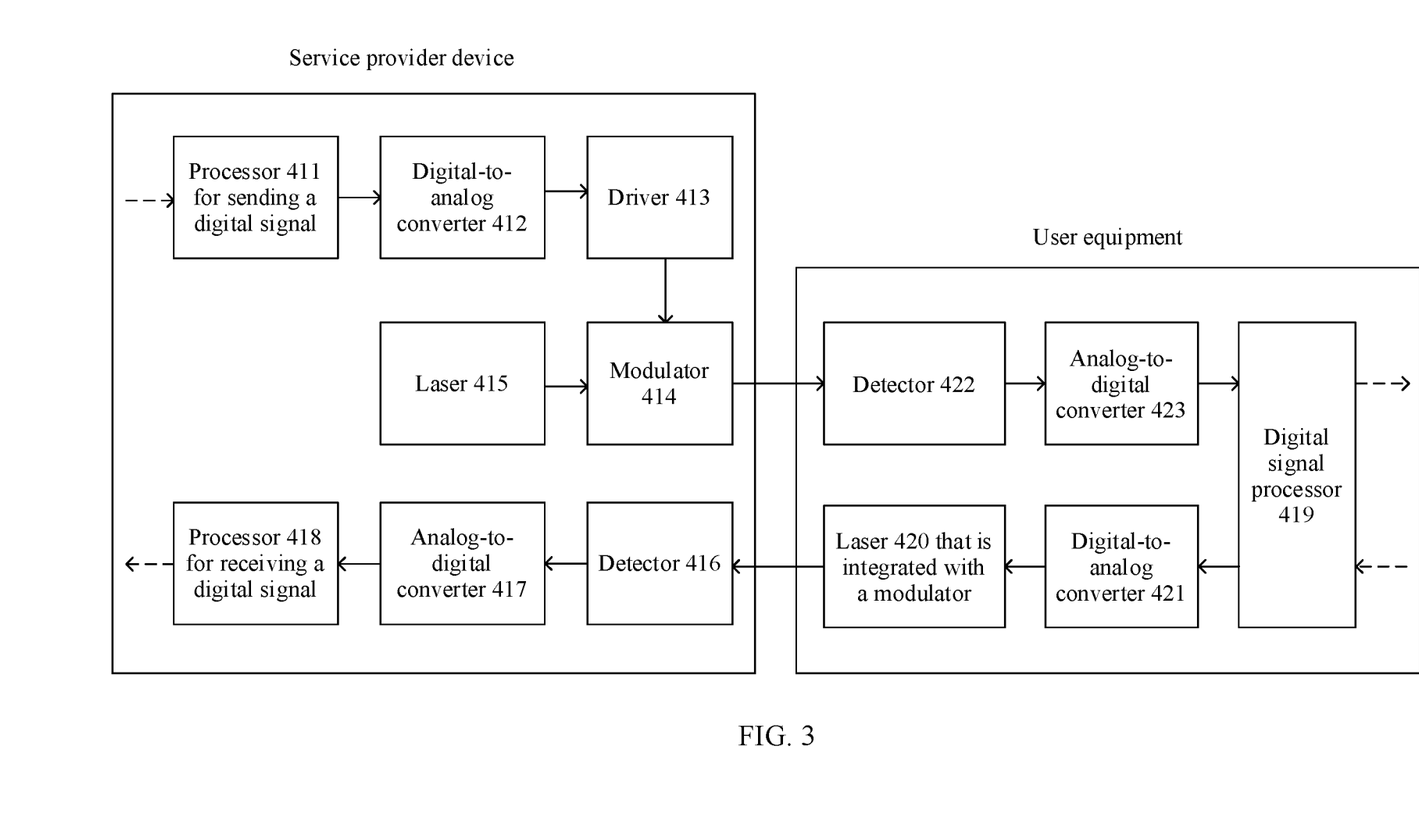
FIG. 3 is a schematic structural diagram of a signal transmission system according to an example embodiment.

In a possible implementation, as shown in FIG. 3, the service provider device may include a processor and a transmitter. The processor may include a processor 411 for sending a digital signal, and the transmitter may include a digital-to-analog converter 412, a driver 413, a modulator 414, and a laser 415. The processor 411 for sending a digital signal may encode received data, and send, to the digital-to-analog converter 412, a digital electrical signal that carries the encoded data. After converting the digital electrical signal into an analog electrical signal, the digital-to-analog converter 412 sends the analog electrical signal to the driver 413. The driver 413 amplifies the analog electrical signal, and sends the amplified electrical signal to the modulator 414. The modulator 414 modulates, based on the amplified electrical signal, an optical signal transmitted by the laser 415, and finally may send the modulated optical signal to the user equipment by using an optical fiber.

The service provider device may further include a receiver. The receiver may include a detector 416 and an analog-to-digital converter 417. The processor may further include a processor 418 for receiving a digital signal. The detector 416 converts a received optical signal into an analog electrical signal, and sends the analog electrical signal to the analog-to-digital converter 417. The analog-to-digital converter 417 converts the analog electrical signal into a digital electrical signal, and sends the digital electrical signal to the processor 418 for receiving a digital signal. The processor 418 for receiving a digital signal decodes encoded data carried in the digital electrical signal, to obtain data sent by the user equipment. After the decoding, the processor 418 for receiving a digital signal may send, to another processor, the data sent by the user equipment, and the another processor further processes the data sent by the user equipment.

Because the user equipment usually uses a component with relatively low costs, an internal structure of the user equipment is relatively simple when compared with that of the service provider equipment. The user equipment may include a processor and a transmitter. The processor may include a digital signal processor 419, and the transmitter may include a digital-to-analog converter 421 and a laser 420 that is integrated with a modulator. The digital signal processor 419 may encode received data, and send, to the digital-to-analog converter 421, a digital electrical signal that carries the encoded data. The digital-to-analog converter 421 may convert the digital electrical signal into an analog electrical signal, and send the analog electrical signal to the laser 420 that is integrated with the modulator. The laser 420 that is integrated with the modulator may modulate an optical signal based on the analog electrical signal, and finally send the modulated optical signal to the service provider device by using an optical fiber.

The user equipment may further include a receiver. The receiver may include a detector 422 and an analog-to-digital converter 423. The detector 422 converts a received optical signal into an analog electrical signal, and sends the analog electrical signal to the analog-to-digital converter 423. The analog-to-digital converter 423 converts the analog electrical signal into a digital electrical signal, and sends the digital electrical signal to the digital signal processor 419. The digital signal processor 419 decodes encoded data carried in the digital electrical signal, to obtain data sent by the service provider device. After the decoding, the digital signal processor 419 may send, to another processor, the data sent by the service provider device, and the another processor further processes the data sent by the service provider device.

Figure 4:
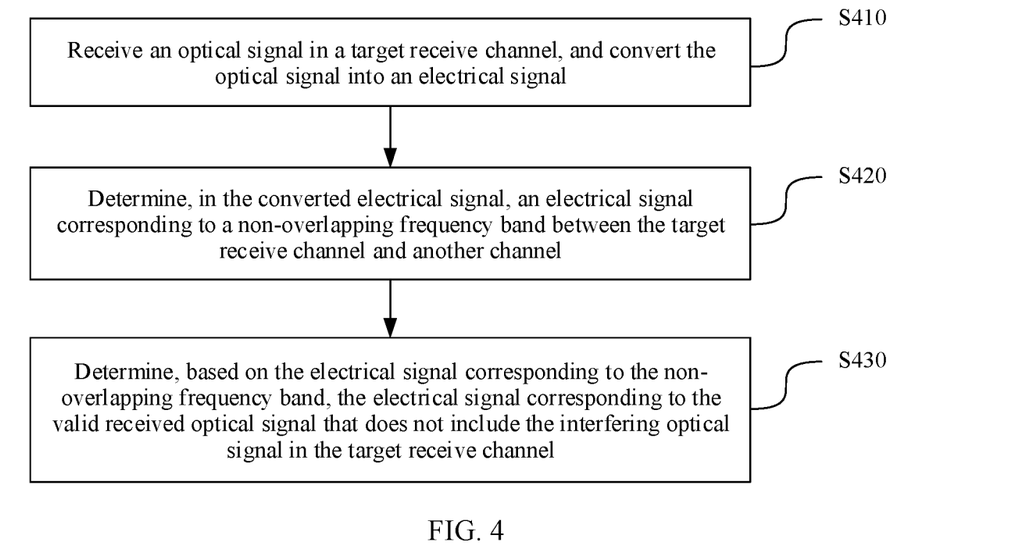
FIG. 4 is a schematic flowchart of a signal processing method according to an example embodiment.

An example embodiment of this disclosure provides a signal processing method. As shown in FIG. 4, a processing procedure of the method may include following steps:

Step S410: Receive an optical signal in a target receive channel, and convert the optical signal into an electrical signal.

Figure 5:
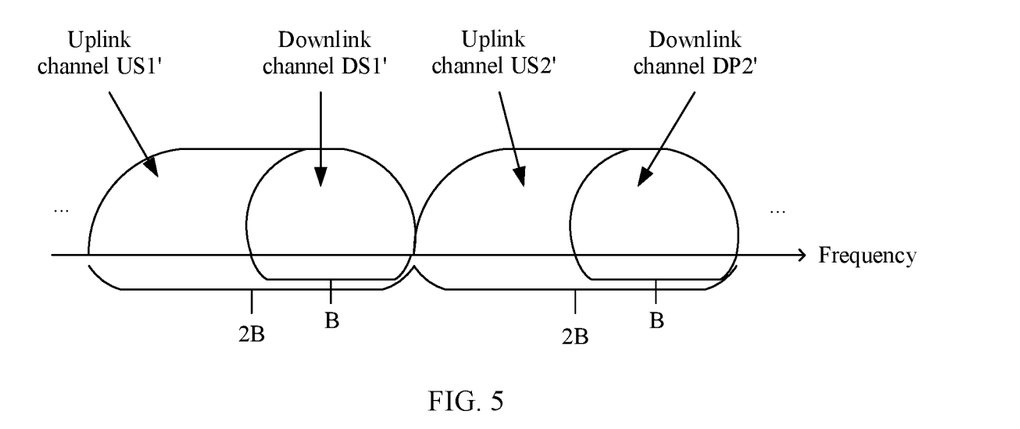
FIG. 5 is a diagram of bandwidth distribution corresponding to an uplink channel and a downlink channel that are used to transmit optical signals according to an example embodiment.

In implementation, during channel division, spectrum resources may be divided to obtain channels shown in FIG. 5. It can be learned from FIG. 5 that a bandwidth occupied by an uplink channel is 2B, and a bandwidth occupied by a downlink channel is B. Herein, B is a preset value. In a process of transmitting an optical signal, uplink may be that an optical signal is transmitted from user equipment to a service provider device, and downlink may be that an optical signal is transmitted from a service provider device to user equipment. When the user equipment sends an optical signal to the service provider device, the uplink channel is used. For the user equipment, a receive channel is the downlink channel. When the service provider device sends an optical signal to the user equipment, the downlink channel is used. For the service provider device, a receive channel is the uplink channel. Each of an uplink optical signal and a downlink optical signal may be one of a double-sideband optical signal or a single-sideband optical signal.

Figure 6:
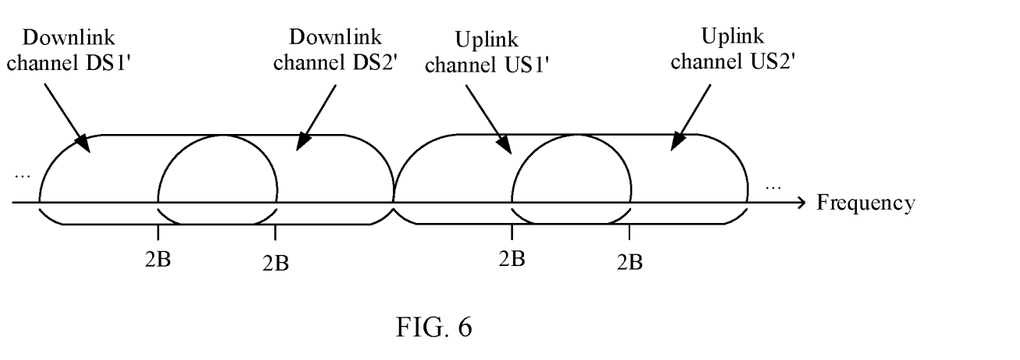
FIG. 6 is a diagram of bandwidth distribution corresponding to an uplink channel and a downlink channel that are used to transmit optical signals according to an example embodiment.

Alternatively, during channel division, spectrum resources may be divided to obtain channels shown in FIG. 6. A bandwidth occupied by two adjacent uplink channels is 3B, and a bandwidth occupied by two adjacent downlink channels is 3B. Herein, B is a preset value. In FIG. 6, a bandwidth of each of two adjacent channels is 2B. Parts of frequency bands of the two adjacent channels overlap. A bandwidth of a part of a frequency band may be less than or equal to a half of a bandwidth of one channel, that is, B.

In a possible implementation, the uplink optical signal may be an intensity modulation optical signal. The intensity modulation optical signal is a double-sideband optical signal. The downlink optical signal is a phase modulation optical signal. The phase modulation optical signal is a single-sideband optical signal. A component configured to modulate an intensity modulation optical signal has relatively low costs. The user equipment usually uses a component with relatively low costs. Therefore, the uplink optical signal may be an intensity modulation optical signal, and a bandwidth occupied by the uplink channel is 2B. A component configured to modulate a phase modulation optical signal has relatively high costs. The service provider device usually uses this type of component to modulate a phase modulation optical signal. Therefore, the downlink optical signal may be a phase modulation optical signal, and a bandwidth occupied by the downlink channel is B.

In this way, in FIG. 1, a bandwidth occupied by an uplink channel and a downlink channel such as an uplink channel US1 and a downlink channel DS1 is 3B; and in FIG. 5, a bandwidth occupied by an uplink channel and a downlink channel such as an uplink channel US1' and a downlink channel DS1' is 2B. The channel bandwidth is reduced by B. Therefore, in the method provided in this embodiment of this disclosure, spectrum utilization is improved, thereby improving a data transmission rate.

In another possible implementation, the uplink optical signal or the downlink optical signal may be an intensity modulation optical signal, that is, a double-sideband optical signal. A part of an overlapping frequency band of two channels is properly set, to improve spectrum utilization, thereby implementing an effect of improving a data transmission rate.

When a signal processing device does not receive an optical signal, the signal processing device may scan a plurality of receive channels. The plurality of receive channels may be scanned by gradually adjusting a local oscillator frequency. When an optical signal is received in a receive channel on a local oscillator frequency, it may be determined that a central frequency of the received optical signal is close to the local oscillator frequency. The signal processing device stores a correspondence between the receive channel and each of an upper limit edge frequency and a lower limit edge frequency. Therefore, the signal processing device may determine a difference between the central frequency of the received optical signal and the local oscillator frequency based on the correspondence and a preset algorithm, and may further determine the central frequency of the received optical signal to adjust the local oscillator frequency, so that the local oscillator frequency is close to the central frequency of the optical signal.

The optical signal in the target receive channel may be received in the foregoing manner. The detector in the signal processing device may be used to detect an optical signal in the target receive channel. The detector may perform optical-to-electrical conversion. The detector outputs an electrical signal related to intensity and a phase of the detected optical signal. The detector may be a homodyne detector. The detector may input an electrical signal to a DSP (digital signal processor) for processing. The DSP is a special microprocessor, and is a component that processes a large amount of information based on digital signals. An operation principle of the DSP is receiving an analog signal, converting the analog signal to a digital signal with 0 or 1, and then performing processing such as modification, deletion, and strengthening on the digital signal. Due to channel overlapping, when the signal processing device receives an optical signal (a valid received optical signal) sent by a peer end, a reflected interfering optical signal is generated from an optical signal sent by a local end of the signal processing device to the outside, and is returned to the local end. In this case, the reflected interfering optical signal is superimposed on the optical signal sent by the peer end. Therefore, an electrical signal corresponding to the superimposed optical signal needs to be processed, to recover an electrical signal corresponding to the valid received optical signal that does not include the reflected interfering optical signal. The recovery process may be implemented by the DSP. The electrical signal corresponding to the received optical signal is processed by using a preset algorithm.

Step S420: Determine, in the converted electrical signal, an electrical signal corresponding to a non-overlapping frequency band between the target receive channel and another channel.

The another channel is a channel that overlaps the target receive channel.

In a possible implementation, the another channel may include a target transmit channel that overlaps the target receive channel, or an adjacent receive channel that overlaps the target receive channel.

Figure 7:
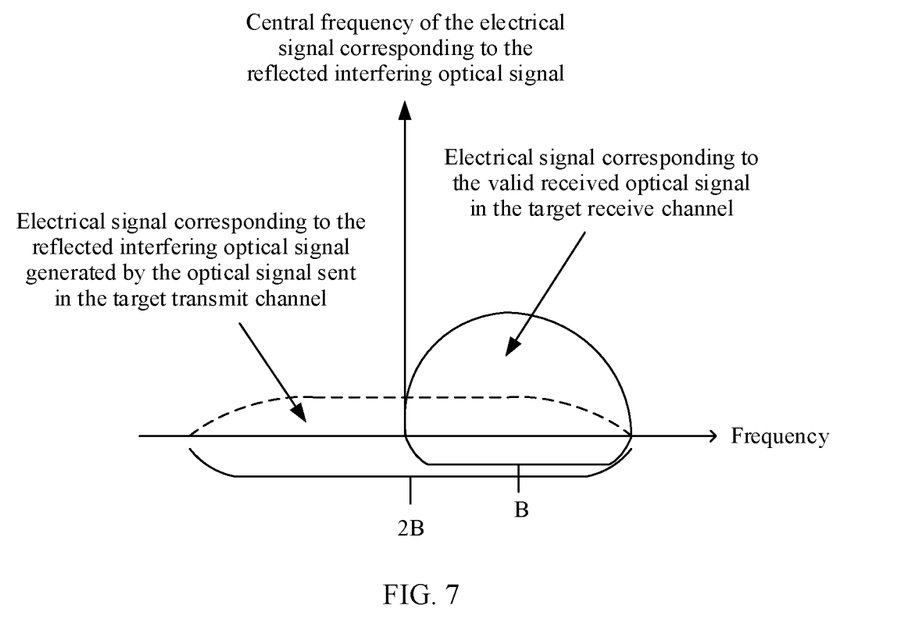
FIG. 7 is a schematic diagram of signal reflection according to an example embodiment.

In implementation, when the another channel is a target transmit channel that overlaps the target receive channel, if the signal processing device is user equipment, the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel. The electrical signal corresponding to the optical signal received by the signal processing device may be shown in FIG. 7.

Figure 8:
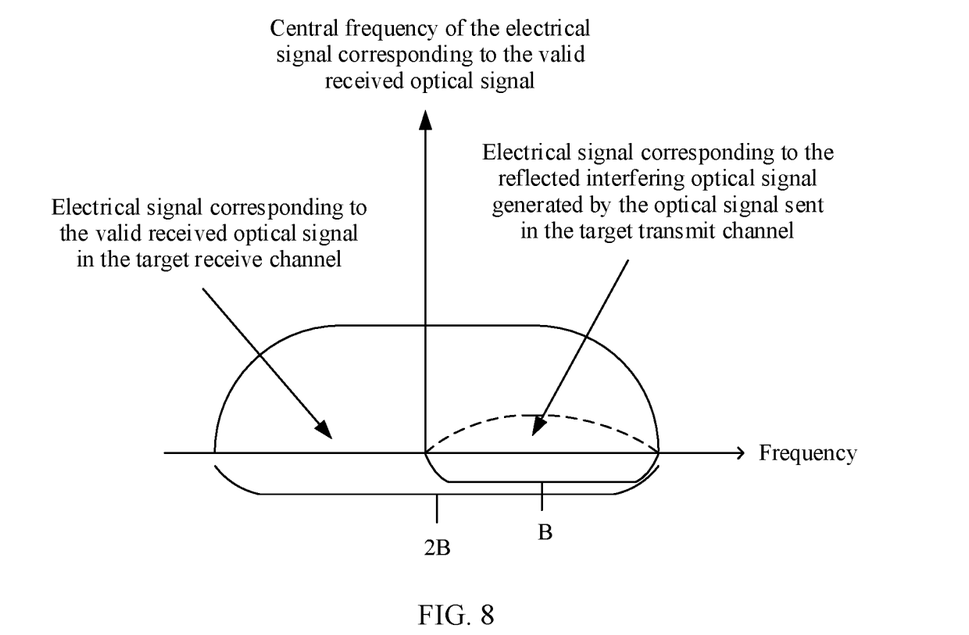
FIG. 8 is a schematic diagram of signal reflection according to an example embodiment.

In addition, if the signal processing device is a service provider device, the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel. The electrical signal corresponding to the optical signal received by the signal processing device may be shown in FIG. 8.

Figure 9:
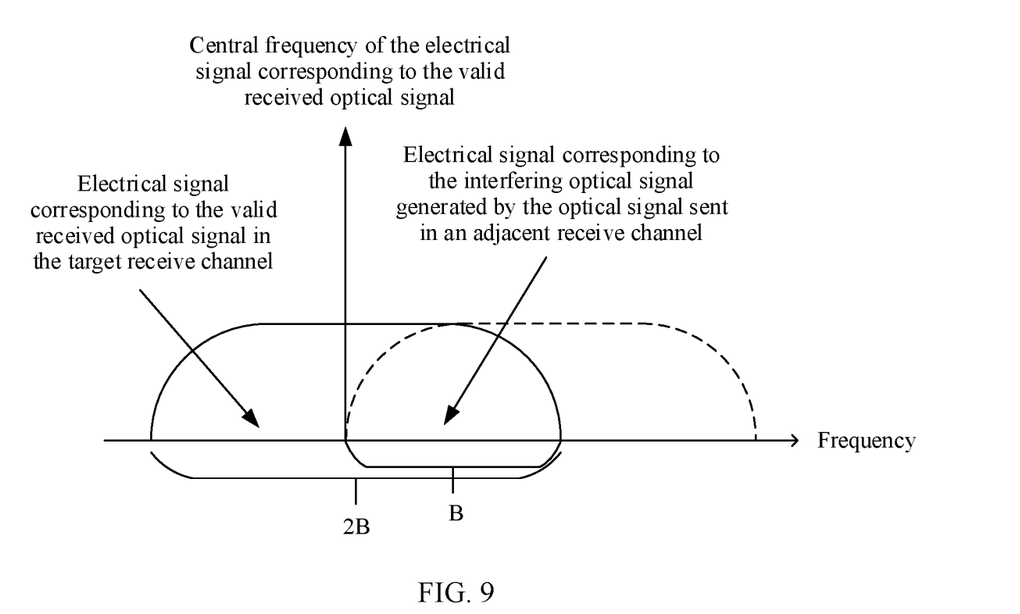
FIG. 9 is a schematic diagram of signal transmission according to an example embodiment.

When the another channel is an adjacent receive channel that overlaps the target receive channel, the valid received optical signal is a double-sideband optical signal, the interfering optical signal may also be a double-sideband optical signal, a part of a frequency band of the adjacent receive channel overlaps the target receive channel, and the part of the frequency band is a frequency band between a central frequency and any edge frequency of the target transmit channel. The electrical signal corresponding to the optical signal received by the signal processing device may be shown in FIG. 9.

Step S430: Determine, based on the electrical signal corresponding to the non-overlapping frequency band, the electrical signal corresponding to the valid received optical signal that does not include the reflected interfering optical signal in the target receive channel.

The interfering optical signal may include a reflected interfering optical signal and a normally transmitted optical signal.

In implementation, if the signal processing device is user equipment, step S430 may include: determining a conjugate electrical signal corresponding to the electrical signal corresponding to the non-overlapping frequency band; determining an electrical signal corresponding to an overlapping frequency band between the target receive channel and the target transmit channel; and determining a difference between the conjugate electrical signal and the electrical signal that corresponds to the overlapping frequency band as the electrical signal corresponding to the valid received optical signal that does not include the reflected interfering optical signal in the target receive channel.

Figure 10:
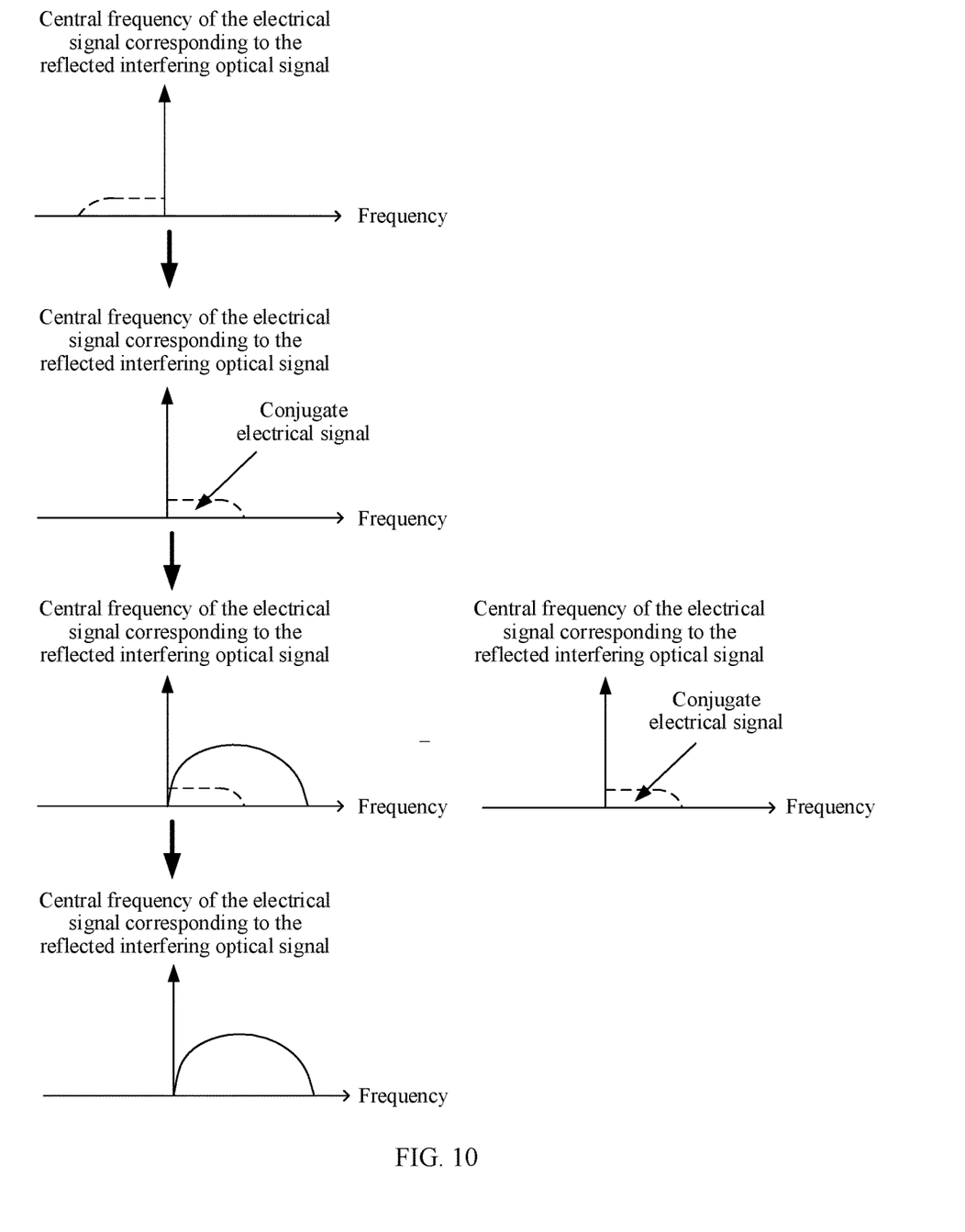
FIG. 10 is a schematic flowchart of a signal processing method according to an example embodiment.

The reflected interfering optical signal is a double-sideband optical signal. The reflected interfering optical signal is subject to a line on which a central frequency is located. Spectrums on two sides of the signal are conjugated. Spectrums on two sides of the electrical signal corresponding to the reflected interfering optical signal are also conjugated. Therefore, the electrical signal corresponding to the valid received optical signal can be recovered based on a conjugate feature. First, a central frequency of an electrical signal corresponding to a received optical signal is a zero frequency. Up-conversion needs to be performed on the electrical signal corresponding to the received optical signal, to place a zero-frequency location on an edge side of the electrical signal corresponding to the non-overlapping frequency band. Then, a low-pass filter is set. A cut-off frequency of the low-pass filter is a frequency corresponding to an edge side of the electrical signal corresponding to the non-overlapping frequency band. Further, the electrical signal corresponding to the received optical signal is input to the low-pass filter, so that a part less than the cut-off frequency can be filtered out. Then, down-conversion is performed on the filtered electrical signal, to recover a frequency of the filtered electrical signal to an initial frequency. In this way, the electrical signal corresponding to the non-overlapping frequency band shown in FIG. 10 can be finally obtained, and a conjugate electrical signal corresponding to the electrical signal corresponding to the non-overlapping frequency band can be further calculated. Then, a high-pass filter may be set. A cut-off frequency of the high-pass filter is a central frequency of the electrical signal corresponding to the reflected interfering optical signal. Further, the electrical signal corresponding to the received optical signal is input to the high-pass filter, so that a part greater than the cut-off frequency can be filtered out. In this way, the electrical signal corresponding to the overlapping frequency band between the target receive channel and the target transmit channel can be finally obtained. Finally, the difference between the conjugate electrical signal and the electrical signal that corresponds to the overlapping frequency band may be determined as the electrical signal corresponding to the valid received optical signal that does not include the reflected interfering optical signal in the target receive channel.

If the signal processing device is a service provider device, step S430 may include: determining a conjugate electrical signal corresponding to the electrical signal corresponding to the non-overlapping frequency band; and combining the conjugate electrical signal and the electrical signal that corresponds to the non-overlapping frequency band, to obtain the electrical signal corresponding to the valid received optical signal that does not include the reflected interfering optical signal in the target receive channel.

Figure 11:
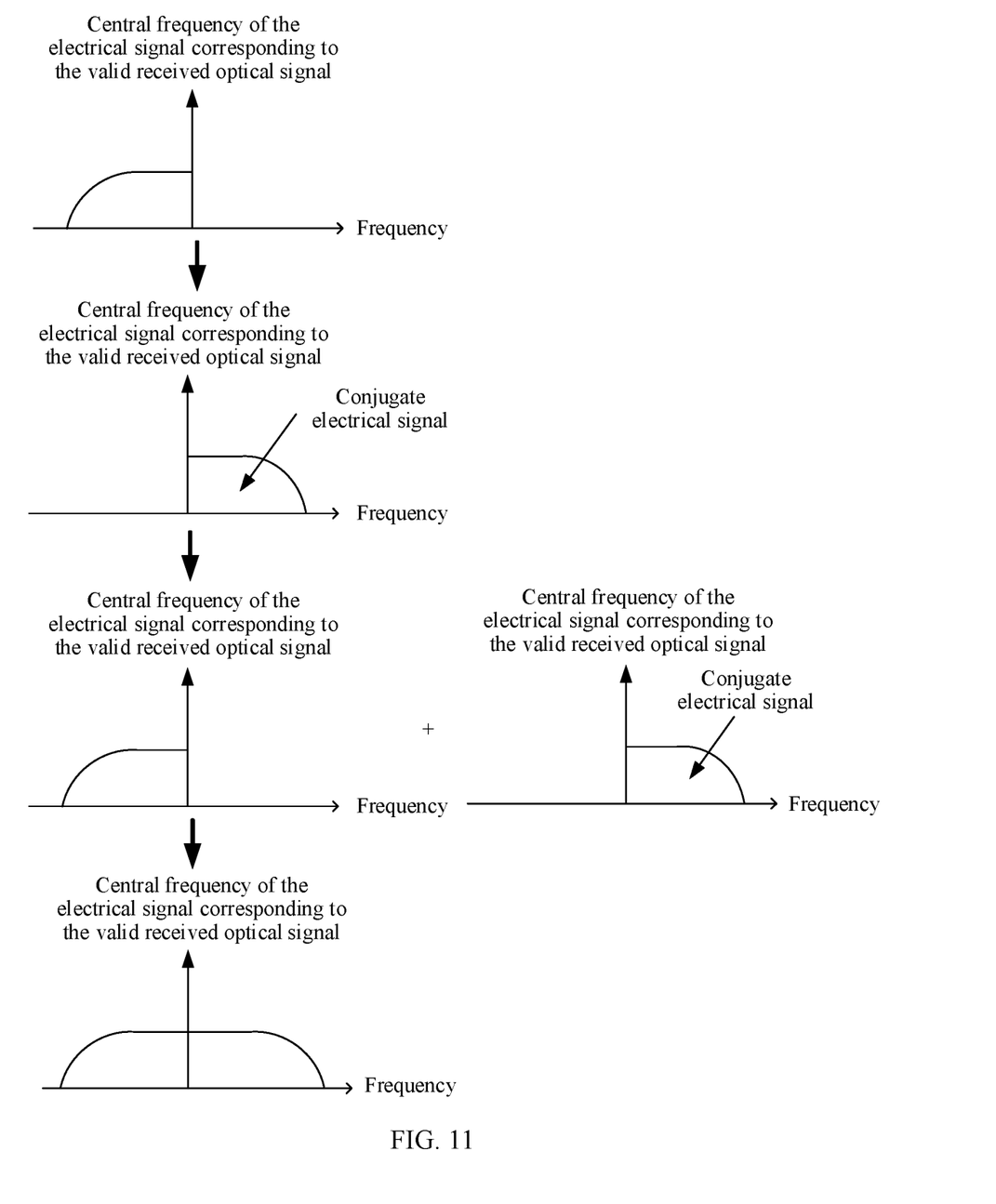
FIG. 11 is a schematic flowchart of a signal processing method according to an example embodiment.

First, a central frequency of an electrical signal corresponding to a received optical signal is a zero frequency. Up-conversion needs to be performed on the electrical signal corresponding to the received optical signal, to place a zero-frequency location on an edge side of the electrical signal corresponding to the non-overlapping frequency band. Then, a low-pass filter is set. A cut-off frequency of the low-pass filter is a frequency corresponding to an edge side of the electrical signal corresponding to the non-overlapping frequency band. Further, the electrical signal corresponding to the received optical signal is input to the low-pass filter, so that a part less than the cut-off frequency can be filtered out. Then, down-conversion is performed on the filtered electrical signal, to recover a frequency of the filtered electrical signal to an initial frequency. As shown in FIG. 11, the electrical signal corresponding to the non-overlapping frequency band can be finally obtained, and a conjugate electrical signal corresponding to the electrical signal corresponding to the non-overlapping frequency band can be further calculated. Finally, the electrical signal corresponding to the valid received optical signal that does not include the reflected interfering optical signal in the target receive channel is obtained through combining the conjugate electrical signal and the electrical signal that corresponds to the non-overlapping frequency band.

When the another channel is an adjacent receive channel that overlaps the target receive channel, step S430 may include: determining a conjugate electrical signal corresponding to the electrical signal corresponding to the non-overlapping frequency band; and combining the conjugate electrical signal and the electrical signal that corresponds to the non-overlapping frequency band, to obtain the electrical signal corresponding to the valid received optical signal that does not include the reflected interfering optical signal in the target receive channel.

In implementation, first, a central frequency of an electrical signal corresponding to a received optical signal is a zero frequency. Up-conversion needs to be performed on the electrical signal corresponding to the received optical signal, to place a zero-frequency location on an edge side of the electrical signal corresponding to the non-overlapping frequency band. Then, a low-pass filter is set. A cut-off frequency of the low-pass filter is a frequency corresponding to an edge side of the electrical signal corresponding to the non-overlapping frequency band. Further, the electrical signal corresponding to the received optical signal is input to the low-pass filter, so that a part less than the cut-off frequency can be filtered out. Then, down-conversion is performed on the filtered electrical signal, to recover a frequency of the filtered electrical signal to an initial frequency. In this way, the electrical signal corresponding to the non-overlapping frequency band can be finally obtained, and a conjugate electrical signal corresponding to the electrical signal corresponding to the non-overlapping frequency band can be further calculated. Finally, the electrical signal corresponding to the valid received optical signal that does not include the reflected interfering optical signal in the target receive channel is obtained through combining the conjugate electrical signal and the electrical signal that corresponds to the non-overlapping frequency band.

In addition to the manner provided in the foregoing embodiment, if the uplink optical signal is an intensity modulation optical signal, and the downlink optical signal is also an intensity modulation optical signal, the electrical signal corresponding to the non-overlapping frequency band may be first determined; then the conjugate electrical signal corresponding to the electrical signal corresponding to the non-overlapping frequency band may be determined; and finally, the electrical signal corresponding to the valid received optical signal is recovered based on the conjugate electrical signal. Likewise, if the uplink optical signal is a phase modulation optical signal, and the downlink optical signal is an intensity modulation optical signal, the electrical signal corresponding to the non-overlapping frequency band may be first determined; then the conjugate electrical signal corresponding to the electrical signal corresponding to the non-overlapping frequency band may be determined; and finally, the electrical signal corresponding to the valid received optical signal is recovered based on the conjugate electrical signal.

In the method provided in this embodiment of this disclosure, the target transmit channel and the target receive channel are set to channels that overlap each other, thereby reducing bandwidths occupied by the uplink channel and the downlink channel. In addition, in the method provided in this embodiment of this disclosure, the electrical signal corresponding to the reflected interfering optical signal received by the signal processing device may be further removed. Even if channels overlap each other, correctly reading data carried in an optical signal is not affected. Therefore, in the method provided in this embodiment of this disclosure, spectrum utilization can be improved, thereby improving a data transmission rate.

Figure 12:
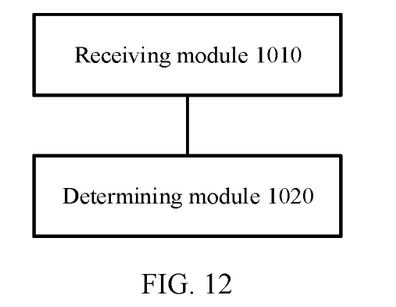
FIG. 12 is a schematic structural diagram of a signal processing apparatus according to an example embodiment.

Another example embodiment of this disclosure provides a signal processing apparatus. As shown in FIG. 12, the apparatus includes a receiving module 1010 and a determining module 1020.

The receiving module 1010 is configured to: receive an optical signal in a target receive channel, and convert the optical signal into an electrical signal. Specifically, the receiving module 1010 can implement a receiving function in step S410 and another implicit step.

The determining module 1020 is configured to determine, in the converted electrical signal, an electrical signal corresponding to a non-overlapping frequency band between a target receive channel and another channel, where the another channel is a channel that overlaps the target receive channel. Specifically, the determining module 1020 may implement a determining function in step S420 and another implicit step.

The determining module 1020 is further configured to determine, based on the electrical signal corresponding to the non-overlapping frequency band, an electrical signal corresponding to a valid received optical signal that does not include an interfering optical signal in the target receive channel. Specifically, the determining module 1020 may implement a determining function in step S430 and another implicit step.

In a possible implementation, the another channel is a target transmit channel that overlaps the target receive channel.

In a possible implementation, the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

In a possible implementation, the determining module 1020 is configured to:

determine a conjugate electrical signal corresponding to the electrical signal corresponding to the non-overlapping frequency band;

determine an electrical signal corresponding to an overlapping frequency band between the target receive channel and the target transmit channel; and determine a difference between the conjugate electrical signal and the electrical signal that corresponds to the overlapping frequency band as the electrical signal corresponding to the valid received optical signal that does not include the reflected interfering optical signal in the target receive channel.

In a possible implementation, the valid received optical signal is a double-sideband optical signal, the interfering optical signal is a single-sideband optical signal, a part of a frequency band of the target receive channel overlaps the target transmit channel, and the part of the frequency band is a frequency band between a central frequency and any edge frequency of the target receive channel.

In a possible implementation, the determining module 1020 is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

In a possible implementation, the another channel is an adjacent receive channel that overlaps the target receive channel.

In a possible implementation, the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

In a possible implementation, the determining module 1020 is configured to:

determine a conjugate electrical signal corresponding to the electrical signal corresponding to the non-overlapping frequency band; and combine the conjugate electrical signal and the electrical signal that corresponds to the non-overlapping frequency band, to obtain the electrical signal corresponding to the valid received optical signal that does not include the reflected interfering optical signal in the target receive channel.

It should be noted that the receiving module 1010 and the determining module 1020 may be implemented by using a receiver and a processor; implemented by using a receiver, a processor, and a memory; or implemented by using a receiver and a processor to execute a program instruction in a memory.

For the apparatus in the foregoing embodiment, specific manners of executing operations by each module are described in detail in the embodiments related to the method, and details are not described herein.

According to the apparatus provided in this embodiment of this disclosure, the target transmit channel and the another channel are set to channels that overlap each other, thereby reducing bandwidths occupied by the channels. In addition, in the method provided in this embodiment of this disclosure, the electrical signal corresponding to the interfering optical signal received by the signal processing device may be further removed. Even if channels overlap each other, correctly reading data carried in an optical signal is not affected. Therefore, in the method provided in this embodiment of this disclosure, spectrum utilization can be improved, thereby improving a data transmission rate.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or a part of the functions described above. In addition, the signal processing apparatus and the signal processing method that are provided in the foregoing embodiments pertain to a same concept. For a specific implementation process, refer to the method embodiments. Details are not described herein.

A person skilled in the art can easily figure out another implementation solution of the disclosure after considering this specification and practicing the disclosure that is disclosed herein. This application is intended to cover any variations, functions, or adaptive changes of the disclosure. These variations, functions, or adaptive changes comply with general principles of this disclosure, and include common knowledge or a commonly used technical means in the technical field that is not disclosed in this disclosure. This specification and the embodiments are merely considered as examples, and the actual scope and the spirit of this disclosure are pointed out by the claims.

It should be understood that this disclosure is not limited to the accurate structures that are described in the foregoing and that are shown in the accompanying drawings, and modifications and changes may be made without departing from the scope of the disclosure. The scope of this disclosure is limited only by the appended claims.

What is claimed is:

1. A signal processing method applied to a signal processing device, the method comprising:

receiving an optical signal in a target receive channel, and converting the optical signal into a first electrical signal;

determining, in the converted first electrical signal, a second electrical signal associated with a non-overlapping frequency band between the target receive channel and another channel, wherein the another channel is a channel that overlaps the target receive channel;

determining a conjugate electrical signal associated with the second electrical signal; and combining the second electrical signal and the conjugate electrical signal associated with the second electrical signal to obtain a third electrical signal associated with a valid received optical signal that does not comprise an interfering optical signal in the target receive channel.

2. The method according to claim 1, wherein the interfering optical signal comprises a reflected interfering optical signal, and the another channel is a target transmit channel that overlaps the target receive channel.

3. The method according to claim 2, wherein the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

4. The method according to claim 3, wherein obtaining the third electrical signal comprises:
determining a fourth electrical signal associated with an overlapping frequency band between the target receive channel and the target transmit channel; and
determining a difference between the fourth electrical signal and the conjugate electrical signal as the third electrical signal.

5. The method according to claim 2, wherein the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel.

6. The method according to claim 1, wherein the another channel is an adjacent receive channel that overlaps the target receive channel.

7. The method according to claim 6, wherein the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

8. The method according to claim 7, wherein the second electrical signal is associated with the non-overlapping frequency band, and wherein the third electrical signal corresponds to the valid received optical signal that does not comprise the interfering optical signal in the target receive channel.

9. A signal processing device comprising a processor and a receiver, wherein:
the receiver is configured to cooperate with the processor to receive an optical signal in a target receive channel, and convert the optical signal into a first electrical signal; and
the processor is configured to
determine, in the converted first electrical signal, a second electrical signal associated with a non-overlapping frequency band between the target receive channel and another channel, wherein the another channel is a channel that overlaps the target receive channel; and
determining a conjugate electrical signal associated with the second electrical signal; and
combining the second electrical signal and the conjugate electrical signal associated with the second electrical signal to obtain a third electrical signal associated with a valid received optical signal that does not comprise an interfering optical signal in the target receive channel.

10. The signal processing device according to claim 9, wherein the interfering optical signal comprises a reflected interfering optical signal, and the another channel is a target transmit channel that overlaps the target receive channel.

11. The signal processing device according to claim 10, wherein the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

12. The signal processing device according to claim 11, wherein the processor is further configured to:
determine a fourth electrical signal associated with an overlapping frequency band between the target receive channel and the target transmit channel; and
determine a difference between the fourth electrical signal and the conjugate electrical signal as the third electrical signal.

13. The signal processing device according to claim 10, wherein the valid received optical signal is a double-sideband optical signal, the reflected interfering optical signal is a single-sideband optical signal, a part of a frequency band of the target receive channel overlaps the target transmit channel, and the part of a frequency band is a frequency band between a central frequency and any edge frequency of the target receive channel.

14. The signal processing device according to claim 9, wherein the another channel is an adjacent receive channel that overlaps the target receive channel.

15. The signal processing device according to claim 14, wherein the valid received optical signal is a double-sideband optical signal, the interfering optical signal is a double-sideband optical signal, a part of a frequency band of the adjacent receive channel overlaps the target receive channel, and the part of the frequency band is a frequency band between a central frequency and any edge frequency of the target transmit channel.

16. A non-transitory computer readable storage medium, comprising one or more instructions, wherein when the computer readable storage medium runs on a signal processing device, the signal processing device is caused to perform at least the following operations:
receiving an optical signal in a target receive channel, and converting the optical signal into a first electrical signal;
determining, in the converted first electrical signal, a second electrical signal associated with a non-overlapping frequency band between the target receive channel and another channel, wherein the another channel is a channel that overlaps the target receive channel; and
determining a conjugate electrical signal associated with the second electrical signal; and
combining the second electrical signal and the conjugate electrical signal associated with the second electrical signal to obtain a third electrical signal associated with a valid received optical signal that does not comprise an interfering optical signal in the target receive channel.

17. The non-transitory computer readable storage medium according to claim 16, wherein the interfering optical signal comprises a reflected interfering optical signal, and the another channel is a target transmit channel that overlaps the target receive channel.

18. The non-transitory computer readable storage medium according to claim 17, wherein the valid received optical signal is a single-sideband optical signal, the reflected interfering optical signal is a double-sideband optical signal, a part of a frequency band of the target transmit channel overlaps the target receive channel, and the part of the frequency band is a frequency band between a central frequency and any edge frequency of the target transmit channel.

19. The non-transitory computer readable storage medium according to claim 17, wherein obtaining the third electrical signal comprises:
- determining a fourth electrical signal associated with an overlapping frequency band between the target receive channel and the target transmit channel; and
- determining a difference between the fourth electrical signal and the conjugate electrical signal as the third electrical signal.

20. The non-transitory computer readable storage medium according to claim 17, wherein the valid received optical signal is a double-sideband optical signal, the reflected interfering optical signal is a single-sideband optical signal, a part of a frequency band of the target receive channel overlaps the target transmit channel, and the part of the frequency band is a frequency band between a central frequency and any edge frequency of the target receive channel.

* * * * *